Jan. 29, 1957   H. N. WALKER   2,779,160
APPARATUS FOR OPERATING VALVE GATES FOR CONTROLLING
DISCHARGE CONDUITS IN DAM CONSTRUCTIONS
Filed Feb. 20, 1953   9 Sheets-Sheet 1

INVENTOR.
HAROLD N. WALKER
BY
ATTORNEYS

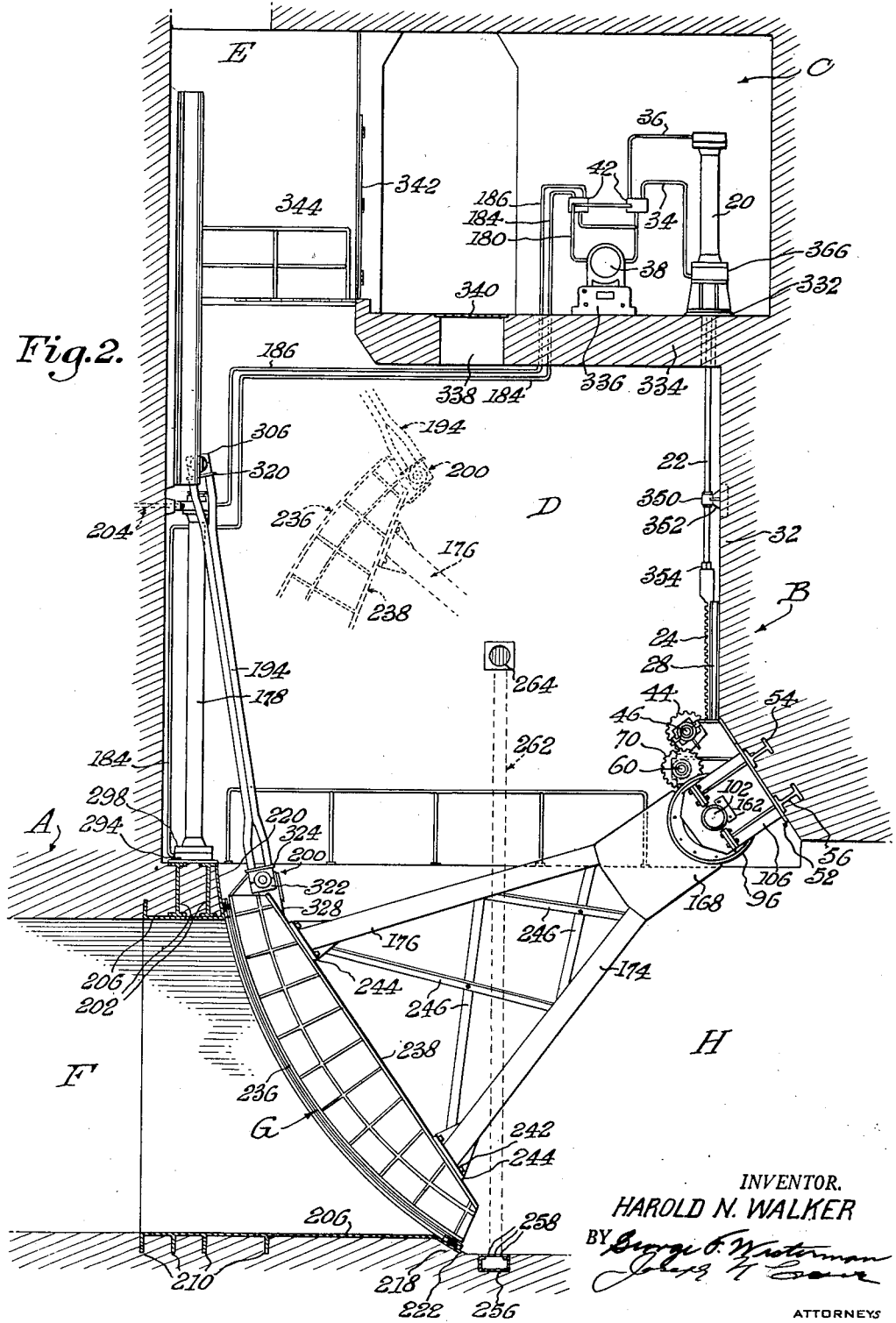

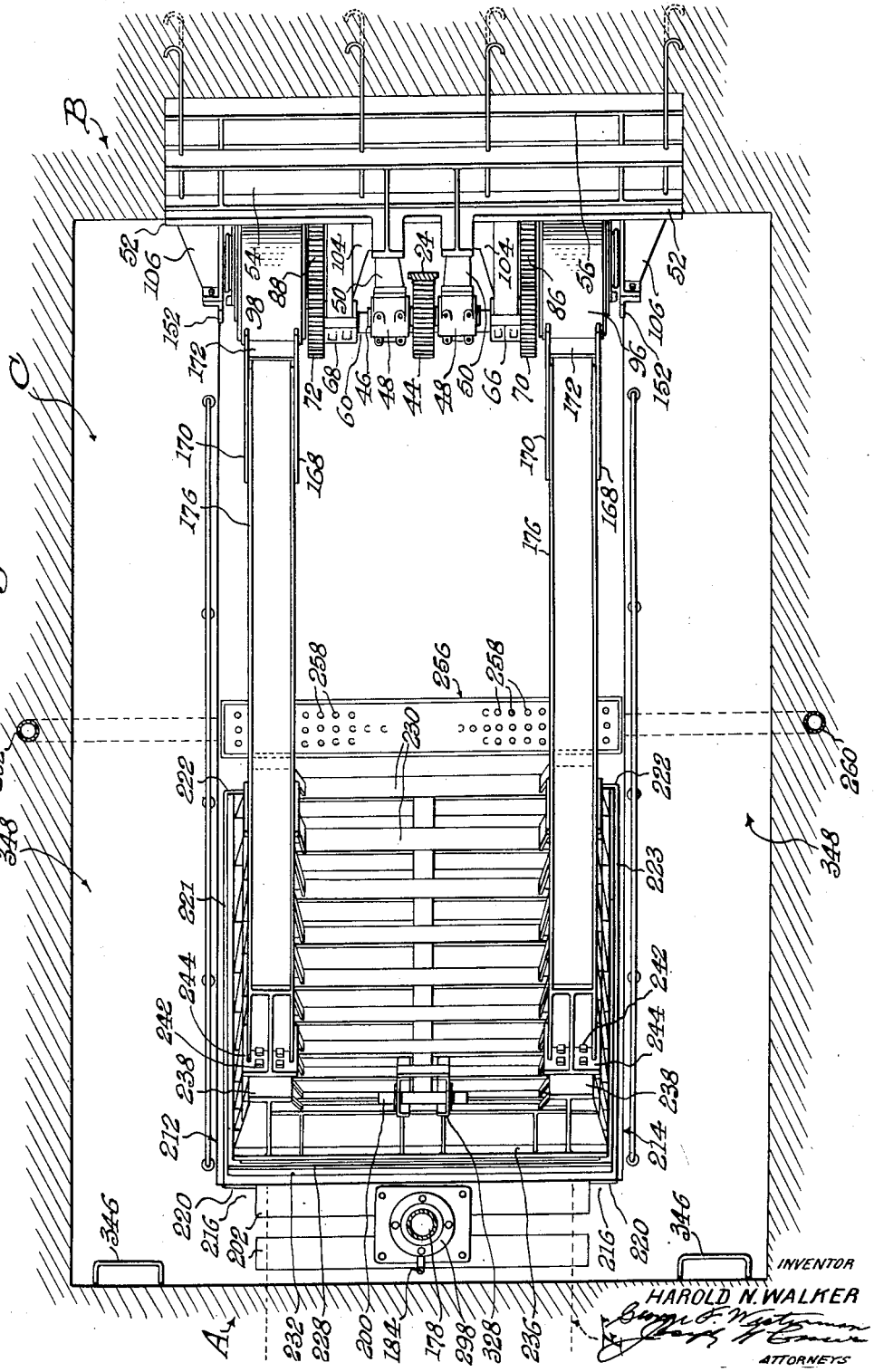

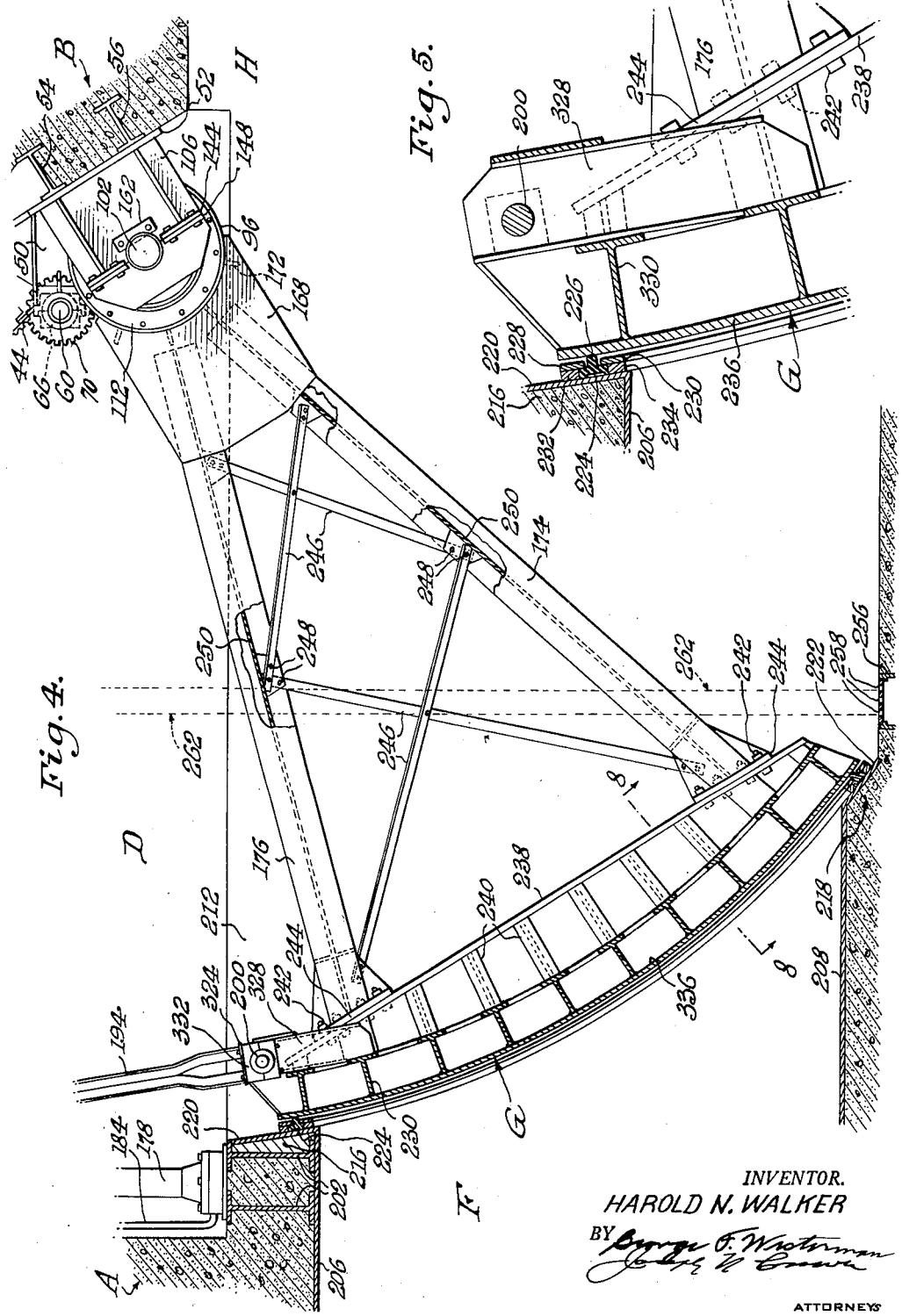

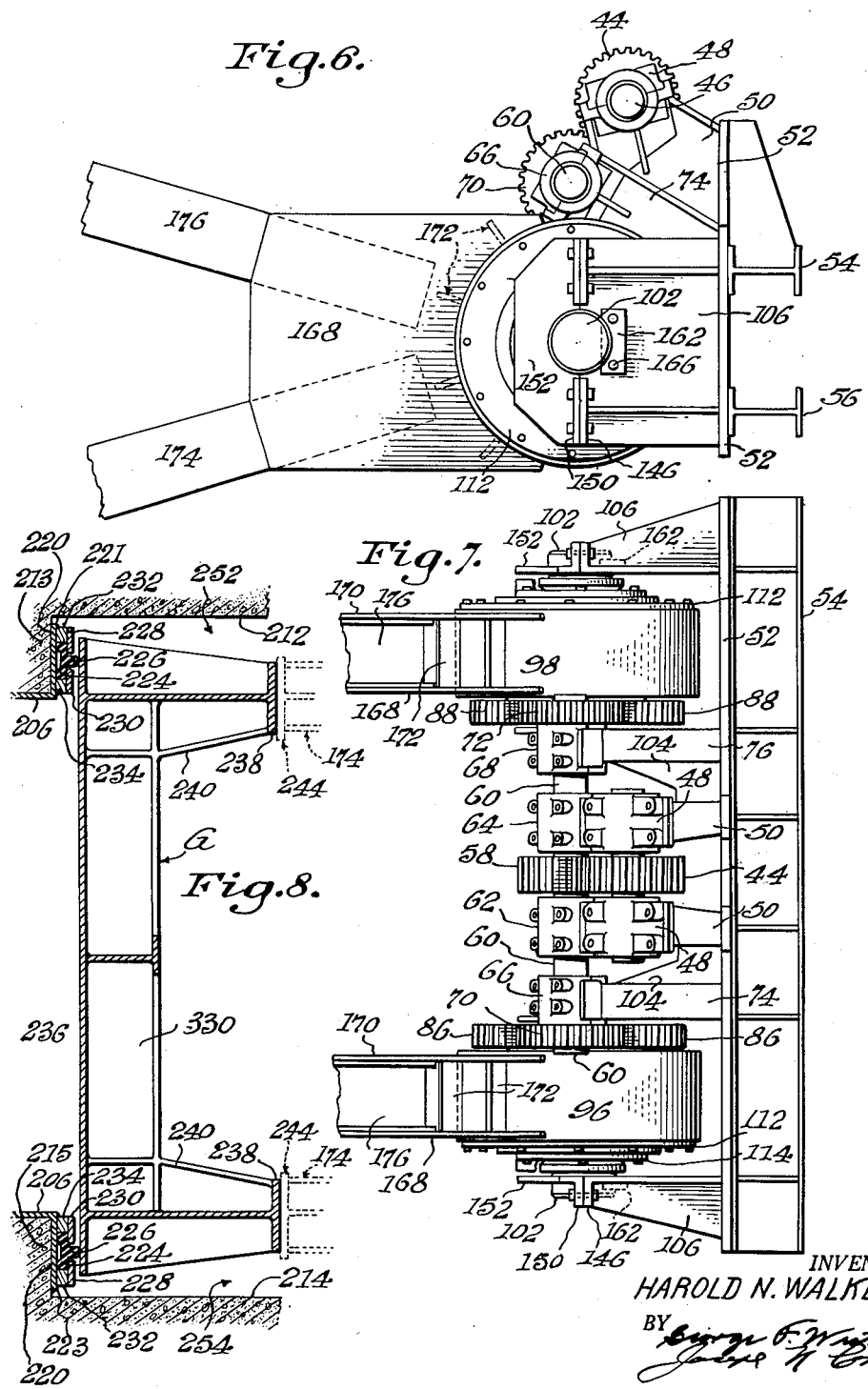

INVENTOR.
HAROLD N. WALKER

ATTORNEYS

Jan. 29, 1957  H. N. WALKER  2,779,160
APPARATUS FOR OPERATING VALVE GATES FOR CONTROLLING
DISCHARGE CONDUITS IN DAM CONSTRUCTIONS
Filed Feb. 20, 1953  9 Sheets-Sheet 7
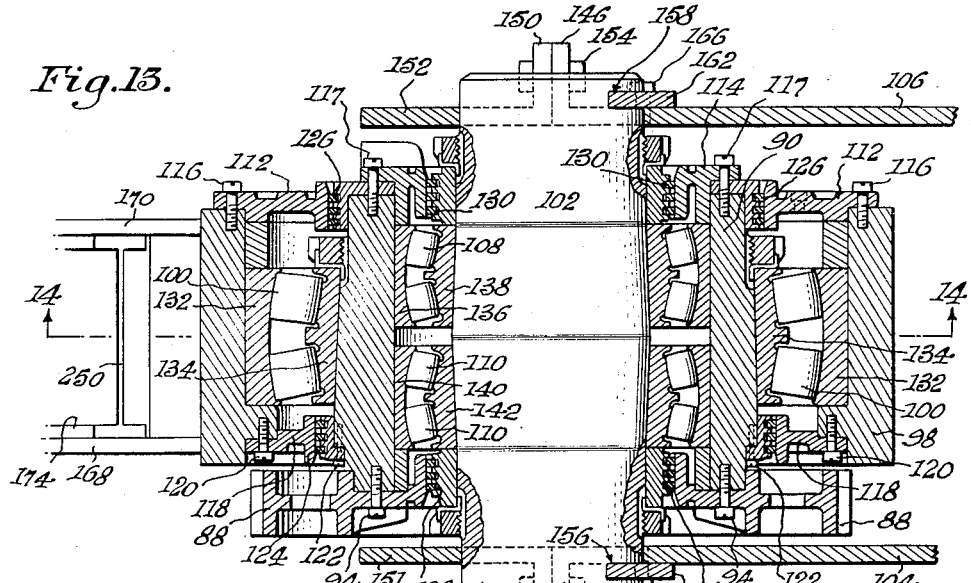
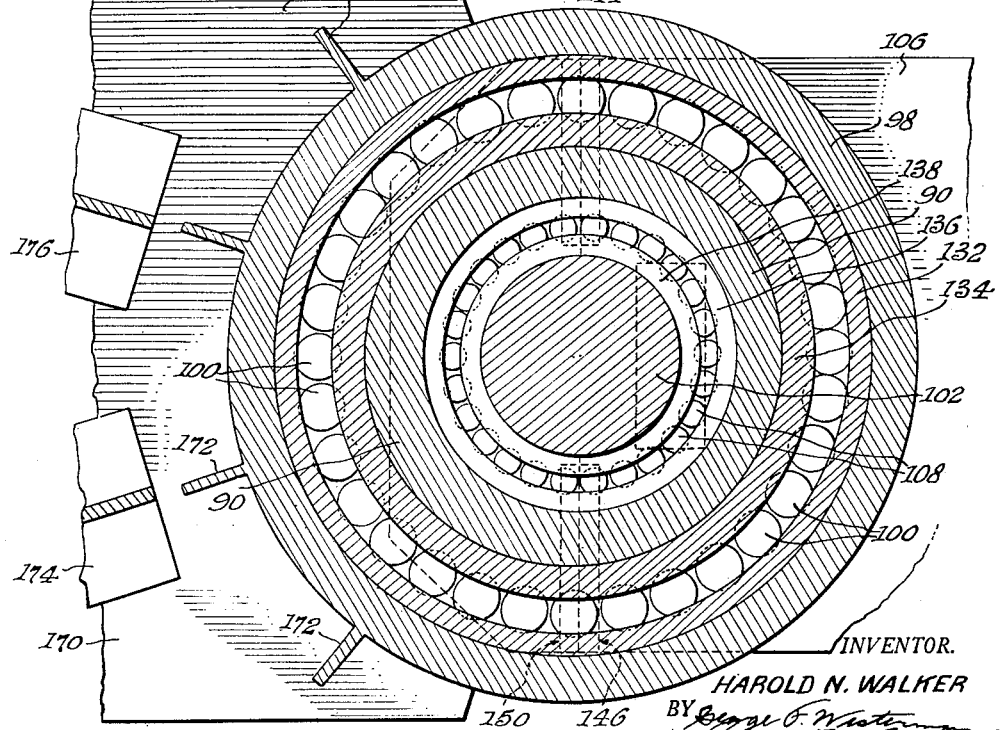
INVENTOR.
HAROLD N. WALKER
BY
ATTORNEYS

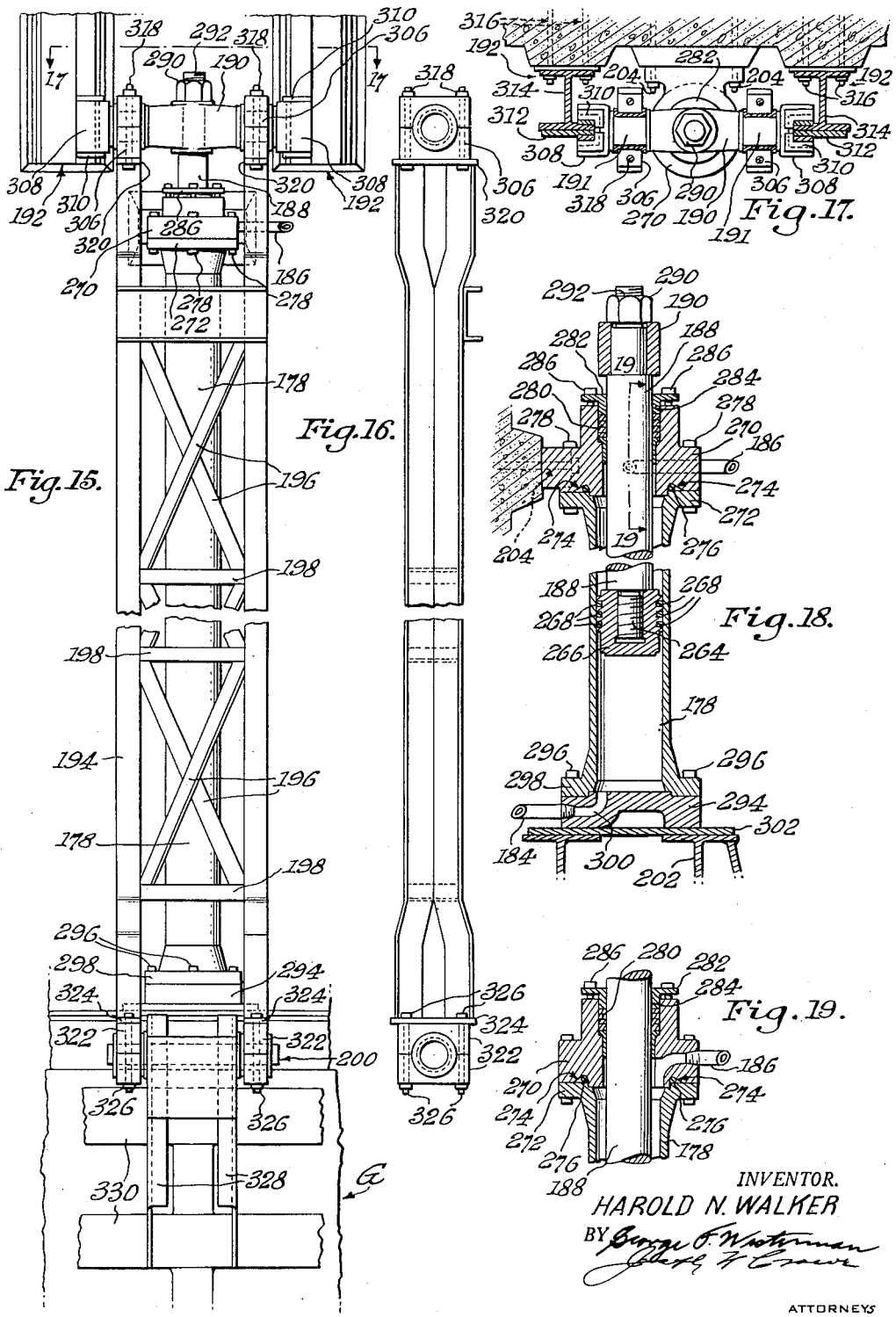

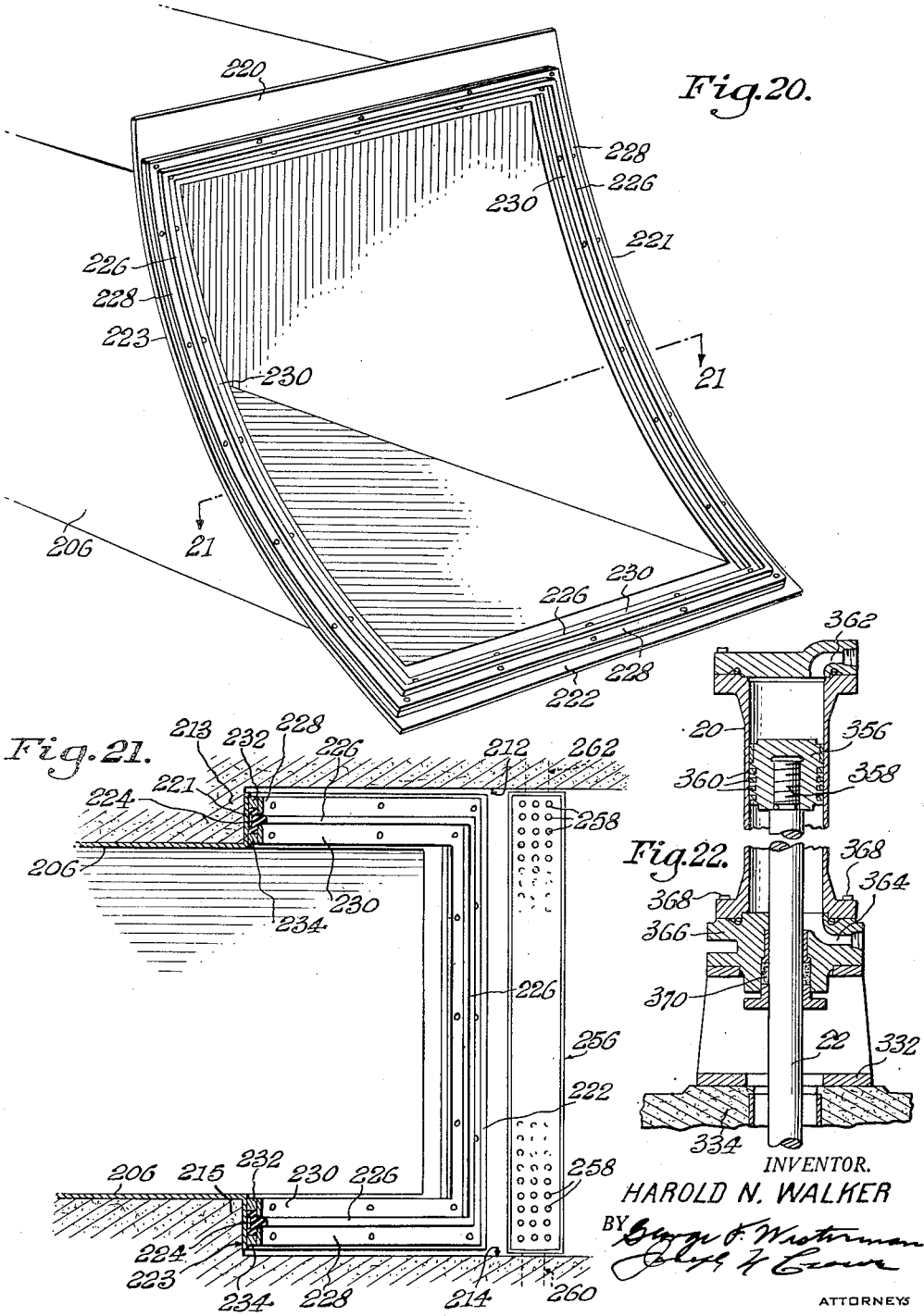

United States Patent Office 2,779,160
Patented Jan. 29, 1957

2,779,160

APPARATUS FOR OPERATING VALVE GATES FOR CONTROLLING DISCHARGE CONDUITS IN DAM CONSTRUCTIONS

Harold N. Walker, Portland, Oreg.

Application February 20, 1953, Serial No. 338,178

9 Claims. (Cl. 61—25)

(Granted under Title 35, U. S. Code (1952), sec. 266)

The invention described herein may be manufactured and used by or for the Government for governmental purposes, without payment to me of any royalty thereon.

The present invention provides certain improvements in the construction of a valve for the regulated release of water impounded by flood control dams. These dams are becoming more and more prevalent and are increasing in height as additional flood control projects are authorized. Difficulties in the design of a successful valve for this type of application are encountered with heads on the valve of over sixty or seventy feet, and with valves of large dimension for the release and regulation of large quantities of water. These valves must be designed and installed in such a manner so that their operation is simple and can be accomplished by a dam tender of ordinary intelligence, and must be push-button controlled. Also, they must be capable of opening to any desired degree and held in that position for any desired period of time. They are a regulating valve and must function properly at any degree of opening. Many valves are successful when they can be operated fully opened or fully closed, but the valves which must be left in partially opened positions are difficult to design.

The tendency is toward increasing height of flood control dams, either without power or combined with power. This increase in height of such dams makes it necessary to install gates or valves which are used for water release and reservoir regulation which operate at higher heads than ever before. There are various types of valves which have been designed for penstock operation at high heads which operate successfully at velocities encountered in penstocks. However, these valves have not proved satisfactory for operations in conduits where conditions of free flow exist. There have been developed also valves known as "tube valves" and "hollow jet valves" for this class of service. However, tube valves have proved extremely expensive and also have developed vibrational tendencies at certain specific heads and openings. The hollow jet valves have been giving comparatively satisfactory service, but these valves are open to the objections of high cost, extremely large heavy castings, the possibility of silt accumulation within the interior element, and comparatively low coefficient of discharge of 0.6.

Another type of valve for high head release is the so-called "Howell Bunger valve." As manufactured, this type valve must be applied to the end of a conduit where the discharge from the valves will not cause erosion or serious icing conditions on adjacent structures such as powerhouse, transmission towers, and the like. If this condition cannot be tolerated, then the valve must be suitably hooded to confine the discharge to the form of a jet or cylinder or high velocity water. Moreover, there have been failures of this type of valve due to fatigue caused by reversals of hydraulic pressures on certain elements of the valves, and, in practice, it is indicated that this type of valve should not be applied to projects where continual operation is desired at heads above one hundred feet.

In view of the disadvantages of the prior constructions which are encountered in practice, it has been demonstrated that there is need for a valve which possesses an attractive discharge coefficient, together with proper hydraulic operating characteristics with comparatively no head limitations, and which can be constructed and installed at a reasonable price.

In conformity with the aforesaid need, the present construction, which is a modified "Tainter-type" valve or gate has been found to incorporate the desirable characteristics for high head free flow discharge. The present construction is applied to a pressure conduit for controlling the flow of water therethrough, and includes improved mechanism for shifting the gate towards and away from the discharge end of the conduit and for raising and lowering the gate to control the actual liquid flow through the conduit. The construction also embraces an improved seal, which comprises specifically a rubber seal which is attached to the stationary frame of the gate and on an off-set in the walls, floor, and ceiling of the conduit, thus placing the seal entirely away from the action of the high velocity water moving along the conduit face. A further features of the present improved construction is the provision of means for effecting a complete aeration of spaces between the issuing jet and the top and bottom, as well as along the sides of the discharge outlet of the conduit, thereby eliminating tendencies of the jet from the conduit to produce excessive erosion of the valve gate and complementary surfaces of the gate frame and conduit due to the creation of areas of vacuum by the issuing jet which springs free of the conduit outlet at its top and bottom and along its sides. The roof of the conduit is raised to a sufficient height so that the issuing jet does not come in contact therewith, and the liquid flow from the lip of the valve downstream is entirely open channel flow.

The principal objects of the invention are indicated in the above paragraph.

Further objects of the invention include a rubber seal of the above-indicated character which can be moved without overcoming the frictional resistance of the skin plate on the seal which is present in the usual valve or gate design, the seal not depending for its sealing characteristics on the pressure of the water back of it to place it in contact with the face of the valve.

A further object of the invention is the provision of a Tainter-type valve or gate which includes a bearing element which can be rotated to retract the face of the valve so that it is not in contact with the rubber seal, thus reducing the forces required to move the valve when seal friction is encountered as in the normal valve or gate, the elimination of seal friction providing a valve having extremely low horse power operating requirements, the valve construction also being characterized by ready replacement of the seal whenever required by simply placing the moving portion of the valve in its extreme open position and thus exposing the top, bottom, and sides of the frame to which the rubber seal is attached, this feature also making possible a ready inspection of the seal at any time for possible damage or wear.

Further objects and advantages of the present improved construction will become apparent as the description proceeds, and the features of novelty will be pointed out in particularity in the appended claims.

The improved construction will be understood more particularly from a consideration of the accompanying drawings, in which:

Fig. 2 is a side elevation of an installation such as that shown in Fig. 1;

Fig. 3 is a top plan view of such construction;

Fig. 4 is a partial side elevation of the construction shown in Figs. 1 and 2, parts being shown in section, the view showing the parts on an enlarged scale;

Fig. 5 is a detail section of the valve lifting rod connection;

Fig. 6 is a fragmentary enlarged side elevation of the pivot end of the valve, and anchor therefor, the view showing also certain of the operating means for retracting and advancing the valve relative to its seat on the water discharge conduit;

Fig. 7 is a top plan view of the parts illustrated in Fig. 6;

Fig. 8 is a horizontal sectional view, taken on the line 8—8 of Fig. 4, looking in the direction of the arrows;

Fig. 13 is an enlarged horizontal section of an eccentric mechanism employed for retracting and advancing the valve relative to its seat;

Fig. 14 is a vertical sectional view, taken on the line 14—14 of Fig. 13;

Fig. 15 is a side elevation of lifting mechanism for the valve, the view illustrating details of a hydraulic lifting cylinder and a lifting rod frame attached to the upper end of the cylinder piston rod and connected to the upper end of the valve;

Fig. 16 is an elevation of the lifting rod frame shown in Fig. 15, the view being taken laterally of Fig. 15;

Fig. 17 is a horizontal section taken on the line 17—17 of Fig. 15, looking in the direction of the arrows;

Fig. 18 is a vertical detailed section of the hydraulic lifting cylinder employed for lifting the valve;

Fig. 19 is a detailed sectional view taken on the line 19—19 of Fig. 18;

Fig. 20 is a perspective view of the orifice of the conduit, illustrating the resilient sealing member which surrounds the orifice and the mounting thereof;

Fig. 21 is a horizontal sectional view taken on the line 21—21 of Fig. 20, looking in the direction of the arrows; and Fig. 22 is a vertical sectional view through the actuating cylinder employed for effecting horizontal movement of the control valve gate relative to the conduit orifice.

Figure 1:
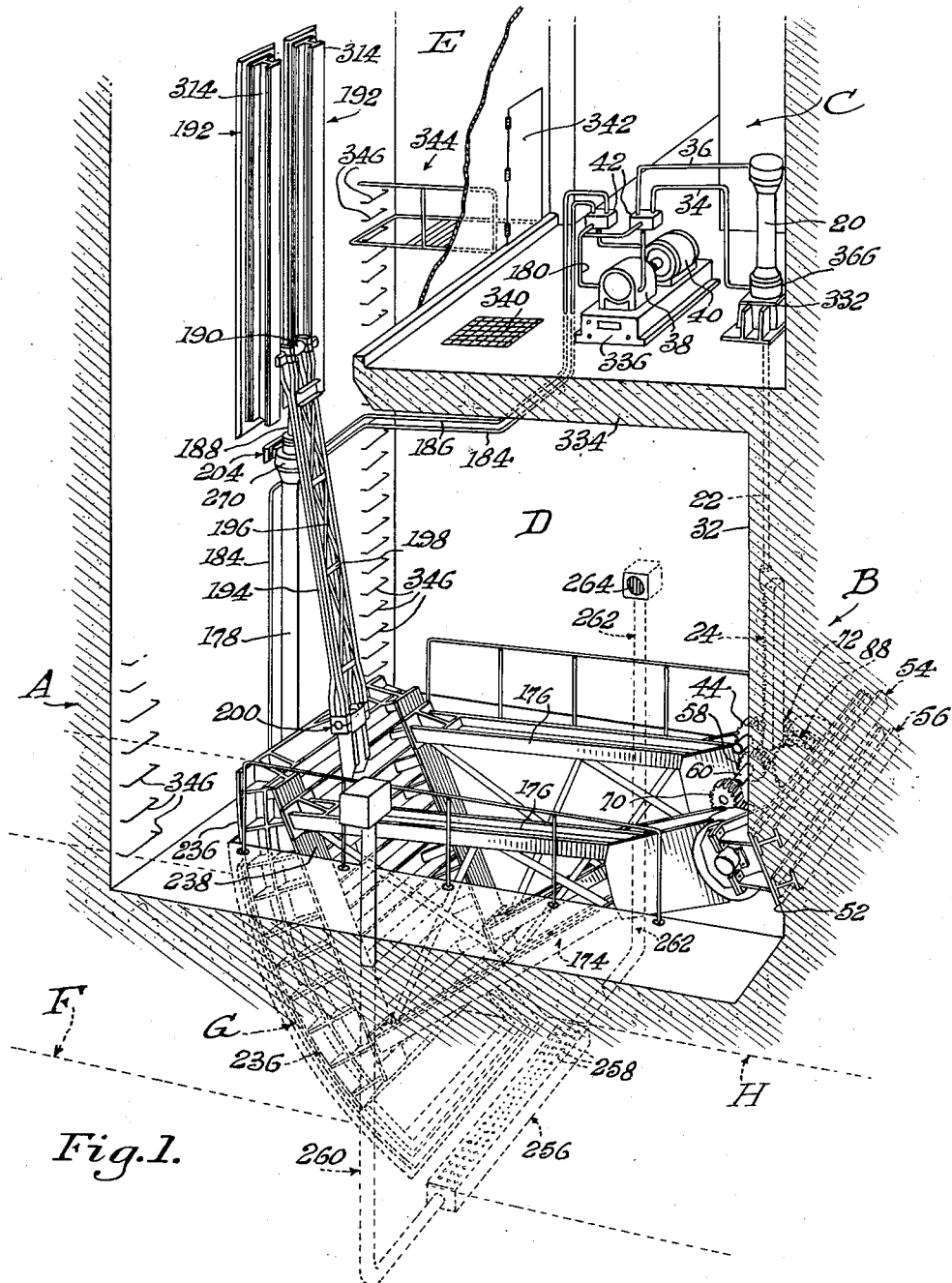
Fig. 1 represents a diagrammatic perspective view of an installation embodying the present improvements, the installation being shown in connection with a flood control, or similar purpose, dam.
Figure 9:
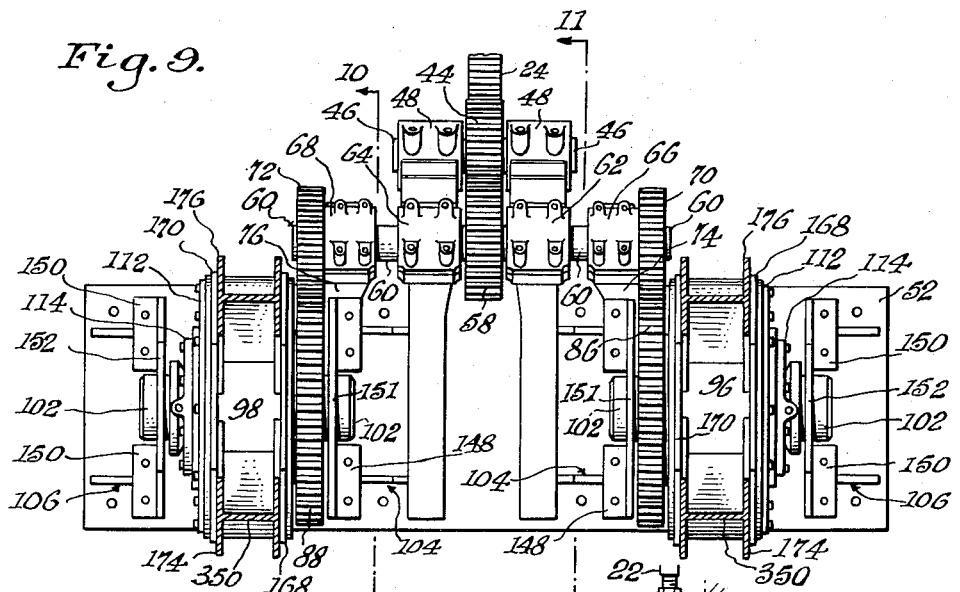
Fig. 9 is a front elevational view of the elements shown in Fig. 6, the arms of the valve being shown in section.
Figure 10:
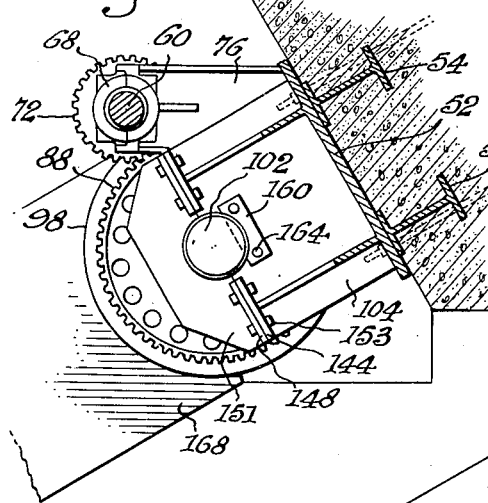
Fig. 10 is a vertical sectional view taken on the line 10—10 of Fig. 9, looking in the direction of the arrows.
Figure 11:
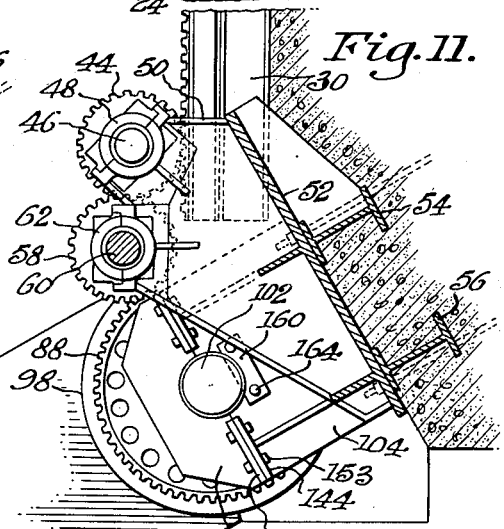
Fig. 11 is a vertical sectional view taken on the line 11—11 of Fig. 9.
Figure 12:
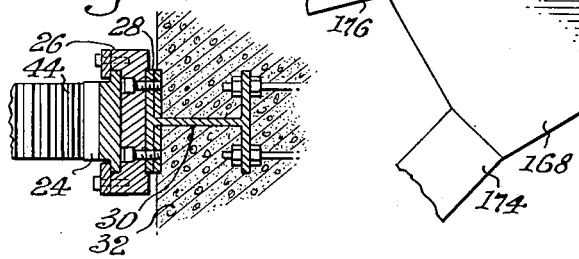
Fig. 12 is a detailed horizontal view showing enlarged details of certain of the valve-actuating elements, the view being taken on the line 12—12 of Fig. 11, looking in the direction of the arrows.

It may be pointed out that the Tainter-type of gate or valve for controlling flow of water through conduits installed in dams or through sluiceways, or the like, is a well-known type of hydraulic flow-control gate, and many patents have been issued directed to structural and operational features and various modifications thereof, such type of gate being basically, however, similar to that disclosed in United States Letters Patent No. 241,444, issued May 10, 1881, to Jeremiah B. Tainter, which patent is noted by way of explanatory illustration only. The control gate of the present construction is employed for controlling high head free flow discharge, and while it may appear to be a usual form of Tainter gate or valve, applied to a pressure conduit, such is not the case, as will become apparent as the description proceeds. Perhaps in the broadest aspects, the present construction may be regarded as being a structure evolved from types described in United States Letters Patent No. 109,984, issued December 6, 1870, to Andrew J. Whitney, and Patent No. 1,587,616, issued June 8, 1926, to Emory Sudler, in that the present construction, in common with these two last-noted patents, includes mechanism for retracting the gate from its closing seat in the conduit prior to its lifting movement. However, the operating mechanism for the gate as employed in the present construction, together with the provision of the improved seal which cooperates with the valve gate when the latter is closed, and the elimination of negative pressures around the valve gate are features which cooperate to make the present construction a marked improvement over all known prior art constructions, particularly from the standpoints of the advantageous effects obtained from actual installations and operation of the present construction.

It will be seen from the drawings that the present valve gate is designed for installation so that the jet which issues from the valve gate escapes under free flow conditions. There is no back pressure on the present valve gate, and the conduit downstream of the valve is designed so that free flow conditions are obtained at all openings of the valve gate. The jet issues from a rectangular opening under the leaf of the valve gate, the top of this rectangle being formed by the sharp edge of the skin plate of the valve. The sides and bottom of the rectangle are formed by the smooth sides and bottom of the conduit. The frame of the valve gate is offset 90° from the top sides and bottom of the conduit and it is upon this offset that the rubber seal, which is in contact with the face of the valve gate, is mounted.

It will be apparent also from the drawings that the issuing jet springs free at the corner of the orifice liner where the offset occurs, and that there is provision for neutralizing negative pressures by introducing air jets into regions in which a vacuum would be created by the liquid flow. Such regions occur in any device through which high velocity water is flowing which are not occupied by water. Water traveling at high velocity tends to move in a straight line, and when attempts are made to change its direction or deviate it from the straight line, water leaves the surfaces of its container. The resulting void between the surface of the container and the water contains neither water nor air, this condition resulting in a vacuum which tends to disintegrate material in the area of the void, and if the condition exists for a sufficient length of time, the material in the area of the void completely disappears. This effect is known as "destructive cavitation" and is encountered in all devices such as pumps, turbines, valves, and similar equipment which control high velocity water. For overcoming the disadvantages of destructive cavitation, in the present construction, air is admitted wherever possible to such areas or regions that may be subjected to this action. This admission of air obviously makes it impossible for a vacuum to form and hence, in the present structure, no cavitation occurs. All gate valves for the release of high head water such as the Tainter type gate valve of the present construction are so designed that the water which is in intimate contact with its conduit container when released through the gate valve, has no tendency to form negative pressure areas at any points downstream from its release. It may be pointed out also that the expression "coefficient of discharge of the valve," referred to above, is a measure of the efficiency of the valve in the release of water and is the ratio of the water which the valve will discharge to the water which the conduit would discharge were there no valve present. In other words, it is the resistance to the flow which any valve sets up by virtue of its attempt to control the flow. The above referred to Howell-Bunger type of valve and other valves of that type which are used for high head releases have coefficients which vary from 0.6 to 0.8 or 0.9, whereas Tainter-type valves of the nature of the present construction have a coefficient of unity since they set up no resistance to the flow when they are completely open.

Specific reference now may be made to the accompanying drawings, and such reference is made first to Figs. 1 and 2, wherein A represents the upstream masonry of a typical flood control dam and B is the downstream masonry, an operating room being indicated at C and a gate chamber being designed at D. The operating room communicates with the gate chamber and with the outer air through an air duct E. A conduit F controlled by segmental valve gate G passes water through the upstream masonry of the dam and into open flow conduit H. The jet which issues from the valve gate G escapes under free flow conditions. There is no back pressure present on the valve gate G and the conduit downstream of the valve (conduit H) is designed so that free flow conditions are obtained at all openings of the valve.

The present improved construction is concerned primarily with the mechanism employed for operating the gate valve together with the sealing means and aerating means. The operating mechanism for the gate G comprises mechanism for retracting the gate G away from the orifice of the conduit F and mechanism for moving the gate vertically after its retraction.

The mechanism for retracting the valve gate G includes a hydraulic cylinder 20 in the operating room C, in which operates a piston including a depending piston rod 22, the lower portion of which is continued into a rack 24 which is reciprocable vertically in a guide track 26 which is secured by welding or otherwise to an outer flange 28 of an anchoring channel 30 which is anchored firmly in the masonry of the rear masonry wall 32 of the valve gate chamber.

Mechanism, which will be described in detail hereinafter, is provided for converting the vertical reciprocations of the piston rod 22 and rack 24 into horizontal reciprocating movement for selectively retracting or advancing the valve gate G relative to its seat on the orifice of the conduit F. In order to effect selective movement of the gate valve G towards and away from the said orifice, there is, of necessity, a reciprocation in a selected manner of the hydraulic piston rod 22 and the rack 24. This selective reciprocation of the piston rod and rack is effected by selective control of oil circulation through pipes 34 and 36, which supply oil through these pipes into the cylinder 20 under action of oil pump 38 operated by a motor 40. Oil from the pump 38 passes to standard type control valves 42 and thence selectively through the pipes 34 and 36. Thus when the flow of oil is through pipe 34, the hydraulic piston in cylinder 20 is raised, thus lifting the piston rod 22 and rack 24, and conversely, when oil is supplied into the cylinder 20 through pipe 36, the piston in cylinder 20 is forced downwardly, with accompanying downward movement of the piston rod 22 and the rack 24. These control valves 42 are of standard known construction and need not be illustrated in detail. They are manually controlled and they have a neutral position, in which no oil flows to the cylinder, a first position in which oil flows under pressure to the top of the cylinder and from the bottom of the cylinder back through the valves as return oil, and a second position opposite that last mentioned in which pressure oil is supplied to the bottom of the cylinder and return oil allowed to escape from the top of the cylinder.

These selective vertical reciprocatory movements of the rod 22 and rack 24 are utilized to retract and advance, selectively, the segmental valve gate G relative to its seat on the orifice of conduit F, as aforesaid. The mechanism for translating these vertical reciprocatory movements of the piston rod and rack into approximately horizontal reciprocatory movements, comprises a pinion 44 mounted on a shaft 46 held in bearings 48 secured to brackets 50 carried by a mounting plate 52 rigidly secured to I-beams 54, 56 that are embedded in the downstream masonry wall of the gate chamber.

The pinion 44 rotatively meshes with a second pinion 58 that is mounted on an elongated shaft 60 which projects through bearings 62, 64 adjacent to the pinion 58, and end bearings 66, 68, adjacent to which are end pinions 70, 72 which are mounted adjacent to the ends of the shaft 60. The end bearings 66, 68 are carried by the plate 52 through bracket arms 74, 76, respectively, while bearings 62, 64 are mounted on the brackets 50 also carried by the plate 52, as aforesaid. The pinions 70, 72 intermesh with large gears 86, 88, respectively, that are connected directly to identical eccentric members 90, one of which is shown in detail in Figs. 13 and 14, by screws or equivalent securing members 94, these identical eccentric members 90 being enclosed in identical trunnion drums 96, 98, respectively, the eccentric members 90 being turnable relative to their trunnion drums on anti-friction (roller) bearings 100, the eccentric members and their drums being mounted on stationary axles or trunnion bearings 102, the ends of which are interlocked with spaced bracket plates 104, 106 which are secured to the plate 52. The eccentrics are turnable (oscillatable) relative to their stationary trunnion bearings 102 on roller bearings 108, 110, responsively to vertical movements (up and down) of the rack 26.

The trunnion drums 96, 98 are connected to their respective eccentrics through closure plates 112, 114, which are secured by cap screws 116, 117 and by another closure plate 118 secured in place by cap screws 120, 122. Suitably disposed packing rings 124, 126, 128 and 130 are provided for retaining lubricant in roller bearing tracks defined between rings 132, 134, 136, 138, 140 and 142.

The stationary trunnion bearing axles 102 are mounted in bracket plates 104, 106 as aforesaid, which are provided with flanges 144, 146, against which abut similar flanges 148, 150 of complementary bracket plates 151, 152, the flanges 144 and 148 being bolted together by bolts 153, and the flanges 146 and 150 being bolted together by bolts 154. The plates 104 and 151, and 106 and 152 are similarly recessed to receive and to seat the stationary axles 102, which are secured rigidly against displacement by the provision of similar slots or grooves 156, 158 adjacent to each end of the axles, into which slots are secured locking plates 160, 162, which locking plates are secured to bracket plates 104, 106 by cap screws 164, 166, respectively.

Secured to the drums 96 and 98 and projecting laterally therefrom towards the valve gate G are similar spaced bracket plates 168, 170, which are braced by transversely extending reinforcing webs 172. Also, there are secured by welding or equivalent means to these bracket plates 168, 170, pairs of I-beams 174, 176, which connect the plates to the lower and upper portions respectively, the valve gate G, these I-beams connecting each of the drums 96 and 98 to the portions of the valve gate most nearly opposite to these drums.

From the foregoing description it will be seen that when the rack 24 is lowered by lowering of the piston in the cylinder 20, such movement of the rack is transmitted to pinions 44 and 58, thence through shaft 60 which carries pinions 70, 72, thence the the large gears 86, 88 that move the eccentrics 90, on the roller bearings 108, 110 to an amount corresponding to the amount of movement of the rack 24, such movement of the eccentrics 90 effecting corresponding movements of the drums 96 and 98, thereby pulling the valve gate G away from its seat on the orifice of conduit F, thus opening the said orifice. Upward movement of the rack 24 reseats the valve gate G to close this orifice.

It will be seen from the drawings, the present construction also involves means for lifting the valve gate G vertically after it is retracted from its seat on the orifice of conduit F. The mechanism for effecting this vertical movement through turning movements of the drums 96, 98 on the roller bearings 100 as actuated by lifting movements of the I-beams 174, 176, comprises a hydraulically actuated piston operating in a cylinder 178 which is disposed vertically adjacent to the front wall of the gate chamber D. Actuation of this piston is effected by selective flow of oil from pump 38 through pipe 180 which leads into one of control valves 42 from which a pipe 184 conveys oil into the bottom of the cylinder 178 below the piston head in this cylinder, and also, selectively, through a pipe 186 entering the top of the cylinder 178 above the piston head. The piston in the cylinder 178 is provided with an upwardly extending piston rod 188 having a cross-head connection 190 which is retained between, and guided by, guide tracks 192 mounted on the forward wall of the operating room C. The cross-head connection 190 forms a pivotal connection between the piston rod 188 and lifting beam 194, which beam is reinforced by bracings 196, 198 and is connected at 200 to the valve gate G, so that when the piston in cylinder 178 is raised, the valve gate G is lifted, the I-beams 174, 176 transmitting the vertical movement to the drums 96, 98, causing these drums to turn on their roller bearings 100. The pivotal connections between the lifting beam 194 and piston rod 188, represented by cross-head connection 190, and the pivotal connection 200 between the lifting beam 194 and the valve gate G, are provided for enabling the aforesaid retraction of the valve gate G from the conduit orifice and the reseating of the valve gate thereon, while enabling a vertical lifting of the said valve gate subsequent to such retraction, and also for enabling the valve gate G to be lowered vertically so that it may be reseated properly on the conduit orifice. It will be observed that this hydraulic cylinder 178 is mounted on I-beams 202 embedded in the dam masonry adjacent to the orifice of the conduit F, and that the upper end of the cylinder 178 is anchored by an anchor member 204 also secured in the dam masonry adjacent to the upper end of the cylinder 178.

The I-beams 202 are mounted on a metallic liner 206 for the conduit orifice, this liner 206 being composed of smooth corrosion-resisting metal such as stainless steel. The liner 206 is anchored in place in the conduit orifice by anchoring flanges 210 which are embedded in the dam masonry. The conduit orifice is provided with lateral offset portions 212, 214, formed by masonry shoulders 213, 215, and is also provided with top and bottom lips 216, 218, such lips being covered with top and bottom flanges 220 and 222 of the liner 206, the masonry shoulders 213 and 215 being covered with lateral flanges 221 and 223 of this liner.

These flanges serve as mounting means for a seal assembly which extends completely around the mouth of the conduit orifice and which constitutes an important feature of the present construction. The seal assembly as shown on the drawings embraces a resilient (rubber) sealing member 224 which has an abutment bead 226 projecting outwardly through a space between spaced retaining plates 228, 230 which are secured in any suitable manner to spacer bars 232, 234 on each side of the sealing member 224, these spacer bars being in turn suitably secured to the aforesaid flanges of the metallic orifice liner 206. The sealing bead 226 of the resilient sealing member extends completely around the mouth of the conduit orifice, and it is against this bead that the outer metallic skin surface 236 of the valve gate G seats when the said gate is in position to cut off flow of water through the conduit F.

This surface 236 of the valve gate is an arcuate segment in shape, and is convex with respect to the complemental concave contour of the mouth of the conduit orifice which the surface 236 is adapted to close. The valve gate G carries rear plates 238 which are reinforcingly connected to the outer surface 236 by reinforcing bracings 240. The I-beams 174, 176, are secured to these inner plates 238 by bolts or equivalent securing means 242 which pass through end flanges 244 provided for this purpose on the ends of the I-beams 174, 176. These I-beams are reinforced by interconnecting cross-bracing 246 secured to horizontal flanges of each of the I-beams, as designated at 248 adjacent to the webs 250 of these I-beams. In practice, therefore, when the piston in cylinder 20 is moved downwardly by admission of oil through pipe 36 above the piston, the downward movement of the piston moves rack 24 downwardly which rotates the eccentrics 90 through a short arc about axles 102, such movement correspondingly retracting drums 96, 98 in an amount corresponding to the amount of turning movement of the eccentrics. The action is transmitted to the I-beam structures interconnecting the drums 96, 98 to the valve gate G, thus unseating the valve gate from the resilient seal 226. Actuation of the piston in cylinder 178 will lift the unseated gate, this movement being in a vertical arc with the axles 102 as their center. The unseating movement of the valve gate from the resilient seal 226 and the orifice mouth of conduit F may be small, a fraction of an inch being sufficient. Reverse movement of the parts re-seats the valve gate G for closing the conduit, the amount of compressional force between the valve gate and the resilient seal 226 being determined by the amount of movement or "throw" of the eccentrics, this being in practice only sufficient to effect a water-tight engagement between the seal and the gate valve.

As will be seen from Fig. 8 of the drawings, for example, the valve gate G terminates at each end short of the offsets 212 and 214 so as to form clearance spaces 252 and 254 which clearance spaces lie outside of the limits of the seal 226, these clearance spaces being provided for a particular purpose as will be explained hereinafter. Attention also is called at this point to the slope of the bottom lip 218 of the conduit orifice as is indicated particularly in Fig. 2.

It has been pointed out above in connection with the objects of this invention that, when the valve gate G is moved away from the orifice of conduit F, the water from the up-stream face of the dam will flow through the conduit F and the orifice mouth thereof, the flow being in straight lines and as a jet which escapes under free-flow conditions through the open downstream conduit. The velocity of the jet depends on the height of the water on the up-stream surface of the dam, that is, the height of the water head. Water traveling at high velocity tends to flow in a straight line as has been mentioned above, and whenever it is attempted to change its direction or deviate from the straight line, water leaves the surfaces of its container. The resulting void between the surface of the container and the water is a vacuum, it containing neither water nor air, that is to say, such space is under "negative pressure," and negative pressures exist in those areas in any device through which high velocity water is flowing which are not occupied by water. This condition of "negative pressures" tends to disintegrate the surfaces in this area, and if the condition exists for a significant length of time the surfaces completely disappear through erosion. This is known as "destructive cavitation" and it is encountered in all devices such as pumps, turbines, valves and similar equipment which control high velocity water. In order to prevent the effects of such destructive cavitation in the present construction, air is admitted to the areas which would be subjected to this action. Such admission of air obviously makes it impossible for a vacuum to form, and hence no cavitation occurs. All valves for the release of high head water are so designed so that the water which is in intimate contact with its conduit container when released through the valve gate has no tendency to form negative pressure areas at any points downstream from its release. Also, it may be pointed out in this connection that the expression "coefficient of discharge of the valve" is a measure of the efficiency of the valve in the release of water and is the ratio of the water which the valve will discharge to the water which the conduit would discharge were there no valve present. In other words, it is the resistance to the flow which any valve sets up by virtue of its attempt to control the flow. Tainter valves of the nature of the present construction have a coefficient of unity since they set up no resistance to the flow when they are completely open.

In order to obviate the regions of "negative pressure" referred to above and in order to effect the aeration of these regions also as mentioned above, it will be seen from the drawings (see Fig. 8, for example) that the valve gate G when closed seats against the resilient bead 226, thus sealing off the flow of water through the conduit orifice, but that the ends of the valve gate terminate short of the conduit offsets 212 and 214 to form the clearance spaces 252 and 254, all as has been mentioned above. The clearance spaces 252, 254 communicate with the atmosphere in the gate chamber D and the operating room C, this latter communicating with the outside atmosphere through the duct E. Therefore, when the valve gate G is opened and raised to its dotted line position as indicated on Fig. 2 of the drawings, the jet of water which becomes released from the orifice of conduit F and springs free from the offsets 212 and 214 of the conduit orifice aspirates air, because of the high velocity of the jet, into the spaces 252 and 254, thereby obviating production of a vacuum in these areas with resultant disintegration of the surfaces which otherwise would occur in time. A further area which requires such protection is the region adjacent to the bottom lip 218 of the bottom offset portion of the conduit orifice. Therefore, a perforated air box 256 is embedded in the masonry of the orifice adjacent to the lip 218, the air box 256 having perforations 258 in its upper surface and communicates with the free air in the gate chamber D through conduits 260, 262, which enter the air box 256 at each end thereof, and which connect with air intakes such as that shown at 264 mounted on the walls of the gate chamber D. The velocity of the issuing jet tends to create a vacuum adjacent to the lip 218 and, therefore, air is aspirated through the air box 256 into the area adjacent to the lip 218, thus preventing the formation of such vacuum. Therefore, it will be seen that the present construction obviates the production of all areas of negative pressure which would be produced were it not for the provision of means for introducing air into such areas responsively to opening the conduit orifice and the release of water therethrough as a free-flowing jet.

Details of the lifting mechanism for the valve gate G are shown in Figs. 15 through 19.

Thus, in Fig. 15, the hydraulic cylinder 178 and the valve gate lifting frame 194 are shown on a substantially larger scale than Figs. 1 and 2. The piston rod 188 is threadedly interlocked, as shown in Fig. 18, at the threaded connection 264 with the piston head 266 which reciprocates vertically in the cylinder 178, depending upon whether the admission of oil into cylinder 178 is through the conduit 184 at the bottom of the cylinder 178 to raise the piston 266, or whether the oil is admitted through top conduit 186 for lowering the piston. The piston 266 is provided with sealing rings 268 to prevent leakage of oil between the piston and the cylinder 178, leakage of oil around the piston rod 188 being prevented by a sealing assembly which comprises a collar 270 secured to a top flange 272 on cylinder 178, the collar 270 having an annular recess 274 adjacent to flange 272 in which is located a sealing ring 276. The collar 270 is secured to the top flange 272 of the cylinder 178 by bolts 278, the collar 270 having an interior bore which is larger than piston rod 188 and which receives packing 280 which seals the bore against leakage of oil, and which is retained in place by a cap 282 having a depending bushing 284 which overlies the packing 280 and prevents displacement of the packing, the cap 282 being secured in place by screws 286. The piston rod 188 is provided adjacent to its upper end with the crosshead 190 which is held by a lock nut 290 mounted on threads 292 on the end of piston rod 188.

The bottom of the cylinder 178 is shown as being mounted on a base 294 by means of cap screws 296 which pass through bottom flange 298 of the cylinder 178 and into the base 294, the intake conduit 184 being connected with a port 300 in the base 294. This base 294 is shown as being mounted on a plate 302 which is carried by I-beam structure 202 which in turn is mounted in the masonry of the dam.

The valve gate G is attached to the piston rod 188 by the reinforced lifting frame 194, as has been mentioned above in this description, the connection of the frame 194 to the piston rod 188 being through the pivotal crosshead connection 190, the pivot trunnions 191 of which operate in bearings 306. The trunnions 191 carry slide elements 308 in which are mounted wear plates 310 which run on hardened flanges 312 of tracks 192, which tracks are illustrated specifically as I-beam structures 314 that are secured by bolts 316 to the masonry of the dam. Additional bolts 318 secure the pivot bearings 306 to top flange 320 of the lifting frame 194. Similarly, the pivot 200 at the bottom end of the lifting frame operates in bearings 322 that are secured to bottom flange 324 of the lifting frame by bolts 326. The pivotal connection 200 connects the lifting frame with a yoke 328 that is mounted on the rear surface of the valve gate G, the attachment between this yoke 328 and valve gate G being by way of bars 330 on the back of the valve gate which act also as stiffening or reinforcing bars for the valve gate.

It will be apparent that the rack actuating cylinder 20 is mounted on a suitable base 332 that is secured in position on masonry floor 334 of the control room C, and that the hydraulic pump 38 and motor 40 are mounted on a base 336 likewise anchored suitably on the floor 334, this floor 334 being provided with suitable holes extending therethrough for passage of the piston rod 22 and oil circulating pipes 184 and 186 leading to the valve gate-lifting cylinder 178. Also, the masonry floor 334 has an observation opening 338 provided therethrough, which is covered by a removable grill 340 that is flush with the top surface of the floor 334 and forms a part thereof, the opening 338 and grill 340 enabling a valve gate tender working in the control room C to inspect the operation of the valve gate. When the valve gate tender desires to enter the operating room D, a door 342 is provided in the front wall of the control room which leads to passageway 344 communicating with ladder rungs 346 anchored to the inner masonry surface of the dam. These rungs lead to passages 348 around the opening in which is located the valve gate G.

It will be seen from Fig. 2 that the piston rod 22 passes through a guide bearing 350 which is anchored through bracket 352 to the adjacent masonry surface of the dam, there being a connection 354 attaching the piston rod 22 to the operating rack 24. As will be seen from Fig. 22, the piston rod 22 is secured to piston head 356 reciprocably operating in the cylinder 20 by threaded connection 358, sealing rings 360 being provided therein for preventing leakage of oil around the piston head. For depressing the piston and rod, oil is admitted into cylinder 20 through port 362 to which pipe 36 is connected, the outlet port then being port 364 extending through bottom collar structure 366 to which the cylinder 20 is secured by cap screws 368 and which is secured to the base 332. Sealing packing 370 is disposed around the piston rod 22, as will be apparent from Fig. 22. It will be apparent also from the foregoing description that the operation of this hydraulically-actuated piston 356 in the cylinder 20 and the operation of piston 266 in cylinder 178 are synchronized in such a manner that when the piston 356 is operated to lower the piston in the cylnider 20 and hence to lower the rack 24 in an amount corresponding to the amplitude of the lowering movement of the piston for correspondingly retracting the valve gate G away from its seat on the conduit orifice, the piston 266 in the cylinder 178 does not lift until after the retraction of the valve gate G away from the seat on the orifice is completed, when lifting movement of piston 266 takes place and the valve gate is lifted clear of the jet stream issuing from the conduit F or to the dotted line position shown in Fig. 2. For returning the valve gate to seating position the piston 266 moves downwardly in cylinder 178 until the valve gate returns to its lowermost position, whereupon piston 356 moves upwardly in its cylinder 20 sufficiently to actuate the rack 24 upwardly sufficiently to cause the valve gate to be pushed against the orifice in its seating position on the resilient seat. The movements of the pistons are accomplished responsively to corresponding actuation of the control valves in the valve boxes 42, which valves are of any suitable conventional type. Also, it will be apparent that the amplitude of movement of the piston 266 is considerably greater than that of the piston 356, this latter being only sufficient to unseat the valve gate and to enable it to clear the confines of the conduit orifice during its vertical movements. During these vertical movements the valve gate is pivoted through corresponding turning movements of the trunnion drums 96, 98 on their bearings 100, the connections between the valve gate and the trunnions 96, 98 being through the pairs of lever beams 174 and 176 and the mounting brackets 168 and 170 therefor which are secured rigidly to the trunnions 96, 98 as has been described above.

It will be understood that the structural features herein described and illustrated in the accompanying drawings represent the assemblies evolved and actually adopted for service, but it will be apparent that very many of the specifically illustrated and described structural details may be varied widely without departing from the concept of the invention and the fundamental scope of the improvements represented by the present construction, which reside in the mechanism horizontally moving the valve gate relative to its seat on the conduit orifice and for vertically moving the valve gate when it is unseated from the conduit orifice, the provision of the resilient seal enclosing the said conduit orifice, against which seal the valve gate seats for sealing off flow of water through the conduit, and means for introducing air into selected spaces around the water jet issuing from the conduit for preventing destructive negative pressures or vacuum building up in such spaces; such variations in structural details being within the purview of engineering and operating skills. It will be apparent, therefore, that accordingly it will be understood and desired to embrace within the scope of this invention such modifications and changes which may be necessary to adapt it to varying conditions and uses, as defined by the appended claims.

Having thus described my invention what I claim as new and wish to secure by Letters Patent is:

1. Mechanism for controlling flow of water through a sluiceway conduit having an orifice through which the water is discharged as a free-flowing high-velocity jet, which comprises a valve gate for seating upon the orifice for preventing flow of water through the orifice, vertically operating hydraulically actuated mechanism including a hydraulic cylinder containing a hydraulically operated piston including a depending piston rod and a rack connected to the piston rod and reciprocably movable therewith, instrumentalities actuated by the movements of the rack for selectively moving the valve gate away from and into closing relation relative to the orifice, the said instrumentalities including a pinion engaging the rack, oscillatably mounted spaced eccentric members turnable responsively to vertical reciprocatory movements of the rack, motion-transmitting gear systems interconnecting the pinion and the eccentric members, and lever means interconnecting the eccentric members to the valve gate, horizontally-acting turning movement of the eccentric members in one direction responsively to vertical movement of the rack in a selected direction pulling the valve gate away from seating position on the orifice, thereby opening the conduit for flow of water therethrough, further horizontally-acting turning movement of the eccentric members in an opposite direction corresponding to opposite vertical movement of the rack oppositely moving the valve gate into its seating position on the orifice of the conduit.

2. Mechanism for controlling flow of water through a sluiceway conduit having an orifice through which the water is discharged as a free-flowing high velocity jet, which comprises a valve gate for seating upon the orifice for preventing flow of water through the orifice, vertically operating hydraulically actuated mechanism including a hydraulic cylinder containing a hydraulically operated piston having a depending piston rod and a rack connected to the piston rod and reciprocably movable therewith, instrumentalities actuated by the movements of the rack for selectively moving the valve gate away from and into closing relation relative to the orifice, the said instrumentalities including a pinion engaging the rack, oscillatably mounted spaced eccentric members turnable responsively to vertical reciprocatory movements of the rack, motion-transmitting gear systems interconnecting the pinion and the eccentric members, trunnion means mounted on the eccentric members and turnable relative thereto enabling vertical movement of the valve gate pivotally relative to the eccentric members, lever means interconnecting the valve gate and trunnion members, and hydraulically actuated lifting means connected to the valve gate for selectively moving the valve gate in up and down vertical directions while the valve gate is retracted by the eccentric members away from its seating engagement on the conduit orifice.

3. Mechanism for controlling flow of water through a sluiceway conduit having an orifice through which the water is discharged as a free-flowing high velocity jet, which comprises a valve gate for seating upon the orifice for preventing flow of water through the orifice, vertically operating hydraulically actuated mechanism including a hydraulic cylinder containing a hydraulically operated reciprocable piston, mechanism actuated by the piston and connected to the valve gate for converting vertical reciprocable movements of the piston into substantially horizontal rectilinear movements for selectively moving the valve gate in a horizontal direction between closing and opening positions relative to the orifice, the said mechanism including a rack forming a portion of the piston and vertically reciprocable therewith, pinion and gear train mechanism operably engaging the rack, trunnion housings interconnected with the valve gate, antifriction bearing means in the trunnion housings including eccentric antifriction bearing races, and means interconnecting the pinion and gear train mechanism to the trunnion housings and to the eccentric bearing races for effecting reciprocatory turning movements thereof and of the trunnion housings responsively to vertical movements of the rack, the trunnion housings being connected with the valve gate by radially extending lever arms and additional vertically reciprocable hydraulically actuated mechanism connected to the valve gate for vertically moving the valve gate between a low position and an elevated position relative to the conduit orifice.

4. In a dam construction provided with a sluiceway conduit for discharging water impounded by the dam, the said conduit having an orifice through which water is discharged as a high velocity jet, a valve gate for controlling flow of water through the conduit, the improvements which comprise lateral off-set surfaces for the orifice defining lateral spaces at each side of the orifice and ends of the valve gate, and a sloping bottom lip for the orifice, the said later off-set surfaces and bottom lip of the orifice defining spaces in which subnormal air pressures are tended to be produced by the issuing jet, a perforate air box mounted in such spaces adjacent to the bottom lip of the outlet orifice, the valve gate having ends terminating short of the lateral off-set surfaces of the orifice, means connecting the resulting lateral spaces at the ends of the valve gate and sides of the said orifice with atmospheric air, and an air intake for the air box for injecting atmospheric air into and through the air box whereby the jet of water issuing from the orifice aspirates air into the lateral spaces and through the air box for preventing formation of areas of vacuum between the jet and surfaces of the conduit orifice.

5. Mechanism for controlling flow of water through a conduit having an orifice through which the water is discharged as a free-flowing high velocity jet, which comprises an arcuately curved valve gate having a convex face for seating upon the orifice for preventing flow of water from the orifice, the said orifice being arcuately curved complementarily to the valve gate and including a seat for receiving the valve gate, the said valve gate having an arcuately concave surface on its side opposite to the convex face, vertically operating hydraulically actuated mechanism including an elongated vertically movable reciprocable rack member for selectively moving the valve gate away from and towards the orifice of the conduit, instrumentalities for converting vertical movements of the hydraulically actuated mechanism into approximately horizontal reciprocatory movements, the said instrumentalities including trunnion housings interconnected with the valve gate, antifriction bearing means located in the trunnion housings including eccentric antifriction bearing races, pinion and gear train means connected to the eccentric antifriction bearing races and also operatively connected to the said rack for actuation by movements of the said rack, rigid lever means connecting the concave surface of the valve gate and the said instrumentalities for transmitting the approximately horizontal movements to the valve gate for selectively unseating and seating the valve gate relative to the conduit orifice, the rigid lever means being radii of the arcuate valve gate extending from the trunnion housings as centers for the arcuate curvature of the valve gate, a second vertically operating hydraulically actuated mechanism directly connected to the valve gate for selectively raising and lowering the valve gate in a vertical plane when the valve gate is separated horizontally from its seat on the orifice, control means for the hydraulically actuated mechanisms for vertically moving the valve gate upwardly and downwardly through the said vertical plane while the valve gate is unseated from the conduit orifice, actuating instrumentalities for the control means for operating the said control means to effect a controlled stopping of movement of the valve gate at any location of partial opening thereof, and means for introducing atmospheric air into areas of normally low pressures on the valve gate and adjacent to the orifice, thereby eliminating formation of such low pressures with avoidance of cavitational destruction and vibration fatigue of the valve gate and structural elements adjacent to the orifice.

6. Mechanism for controlling flow of water through a sluiceway conduit having an orifice through which the water is discharged as a free-flowing high velocity jet, which comprises a valve gate for seating upon the orifice for preventing flow of water through the orifice, vertically operating hydraulically actuated mechanism for moving the valve gate horizontally between a retracted position away from the orifice and closing position for closing the orifice, instrumentalities for converting vertical movements of the hydraulically actuated mechanism into approximately horizontal movements, means connecting the said instrumentalities and the valve gate for transmitting the approximately horizontal movements to the valve gate for selectively unseating and seating the valve gate relative to the conduit orifice, a second vertically operating hydraulically actuated mechanism, means directly connecting the said second mechanism to the valve gate for selectively lifting and lowering the valve gate in a vertical plane, control mechanism for the said second mechanism for effecting both the lifting and lowering of the valve gate during the time interval in which the valve gate is in retracted position away from the orifice, and operating means for the control mechanism for stopping movements of the valve gate relative to the orifice at any selected location of partial opening between limits of complete closing and complete opening of the valve gate with respect to the orifice.

7. Mechanism for controlling flow of water through a sluiceway conduit through which the water is discharged as a free-flowing high velocity jet, which comprises a valve gate for seating upon the orifice for preventing flow of water through the orifice, vertically operating reciprocatory means for moving the valve gate horizontally between a retracted position away from the orifice and closing position for closing the orifice, mechanism connecting the vertically operating means with the valve gate, the said mechanism comprising directional-changing motion-transmitting mechanism for changing vertical movements of the vertically operating means into approximately horizontal movements, means connecting the said directional-changing motion-transmitting mechanism to the valve gate for transmitting the horizontal movements to the valve gate, and operating means for the said mechanism connecting the said mechanism to the said vertically operating means for reciprocating directions of actuation of the said mechanism responsively to reciprocal vertical movements of the said vertically operating means to shift the valve gate between its fully retracted and closing positions and any selected intermediate position of partial opening relative to the said orifice of the sluiceway conduit.

8. Mechanism for controlling flow of water through a sluiceway conduit having an orifice through which the water is discharged as a free-flowing high velocity jet, which comprises a pair of vertically operating, hydraulically-actuated pistons arranged for vertical reciprocatory movements, a valve gate for seating upon the orifice for preventing flow of water through the orifice, mechanism interconnecting the valve gate to one of the said pistons and including direction-changing motion transmitting means for shifting the valve gate horizontally between closing position against the orifice and opening retracted position away from the orifice responsively to corresponding vertically reciprocatory movements of the piston, means connecting the second hydraulically actuated piston directly to the valve gate for raising and lowering the valve gate in a vertical plane responsively to vertical reciprocations of the said second piston, control means for both pistons of the said pair, the control means for the second piston effecting the raising and the lowering of the valve gate in the said vertical plane during the time interval that the first-mentioned piston of the pair is maintaining the valve gate in retracted position away from the said orifice, actuating means for the control means for stopping movements of the valve gate at any selected point of partial opening relative to the orifice, and means for introducing air into areas of normally reduced pressures on and adjacent to the valve gate and orifice for preventing formation of reduced air pressures in the said areas.

9. Mechanism for controlling flow of water through a sluiceway conduit having an orifice through which the water is discharged as a free-flowing high velocity jet, which comprises an arcuately curved valve gate having a convex surface for seating upon the orifice for preventing flow of water through the orifice, the said orifice having a circularly arcuate contour complemental to the arcuate surface of the valve gate and concentric therewith, a resilient seal peripherally enclosing the orifice against which seal the valve gate seats, means for introducing atmospheric air at selected locations of vacuum adjacent to the conduit orifice and high velocity water jet issuing through the orifice for neutralizing locations of vacuum production, and means for permanently securing the seal in place while enabling removal of the seal for replacement when worn.

References Cited in the file of this patent

UNITED STATES PATENTS

| | | |
|---|---|---|
| 1,587,616 | Sudler | June 8, 1926 |
| 1,656,183 | Enz | Jan. 17, 1928 |
| 1,656,184 | Enz | Jan. 17, 1928 |
| 1,847,933 | Duwe | Mar. 1, 1933 |
| 2,011,641 | Kruse | Aug. 20, 1935 |
| 2,045,824 | Becker | June 30, 1936 |
| 2,631,759 | Hoopes | Mar. 17, 1953 |
| 2,633,325 | Whitlock | Mar. 31, 1953 |

FOREIGN PATENTS

| | | |
|---|---|---|
| 223,161 | Germany | June 15, 1910 |
| 568,067 | France | Dec. 15, 1923 |